Patented Jan. 20, 1953

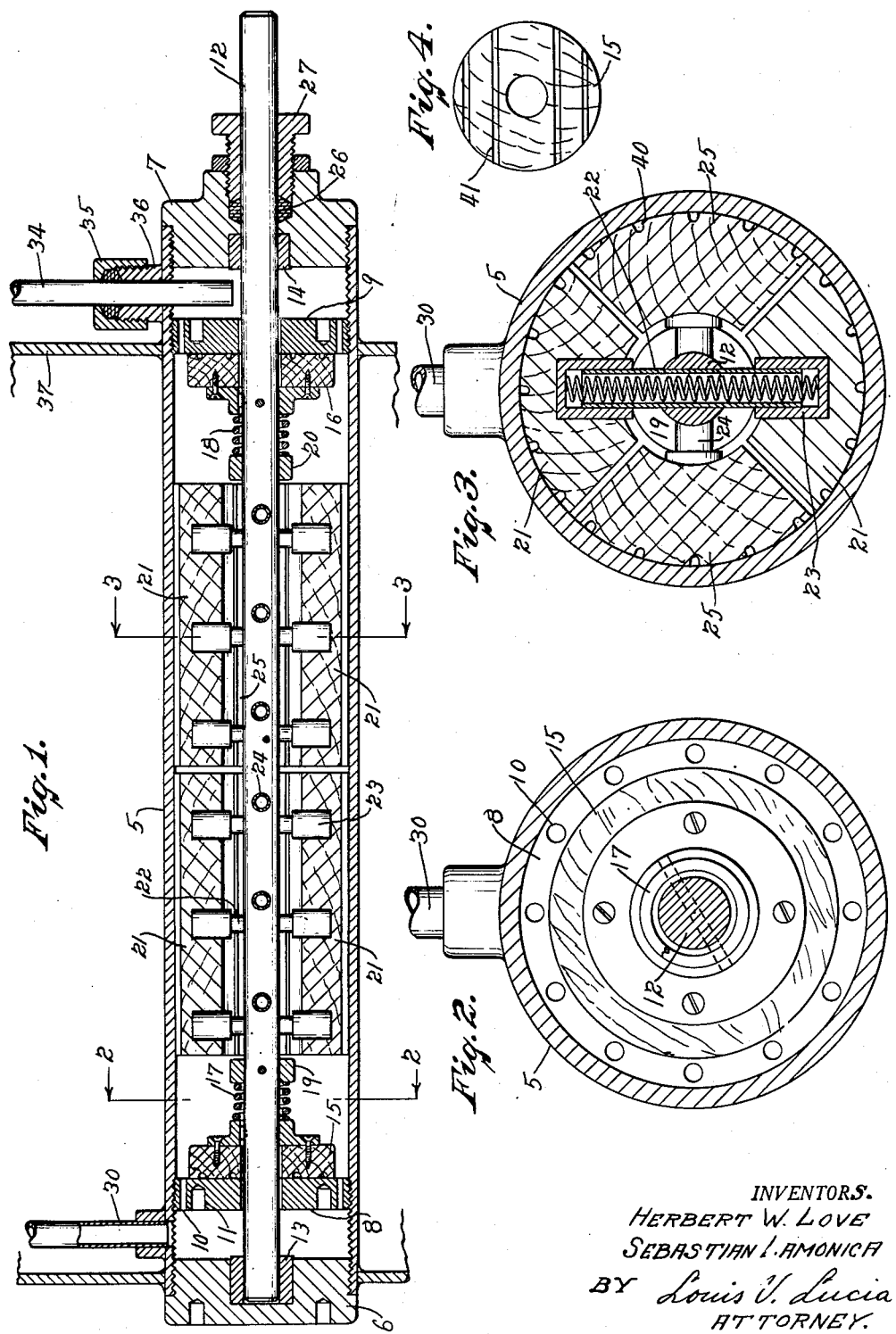

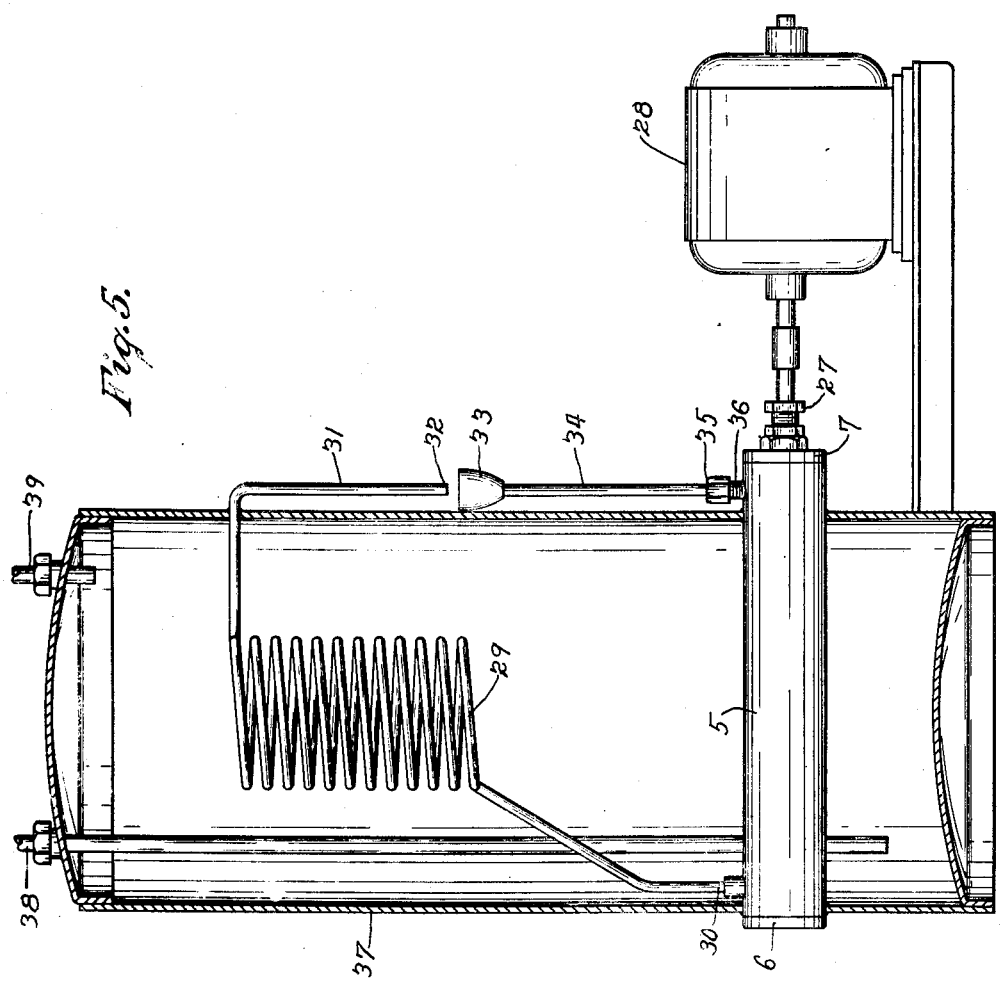

2,625,929

UNITED STATES PATENT OFFICE 2,625,929

FRICTION HEAT GENERATOR

Herbert W. Love, Coventry, and Sebastian La Monica, Avon, Conn.

Application October 29, 1949, Serial No. 124,307

5 Claims. (Cl. 126—247)

This invention relates to a friction heat generator and more particularly to a device for generating heat by friction and to a system for transferring said heat for the purpose of heating water or the like.

We have found by extensive research that, in order to efficiently generate heat by friction for long periods of time, it is necessary to provide a lubricant which will prevent wear between two friction producing surfaces and still permit generation of heat. While various lubricants may be used, we have found a specific type of oil to be the most efficient but, as common with all lubricating oils, the turbulence and heat created within the friction producing mechanism causes foam and pressure within which must be released.

It is an object of this invention, therefore, to produce a friction heating device of very high efficiency and improved construction providing novel advantages over such devices as heretofore known.

It is a further object of the invention to provide a system for transferring heat from said device which will condense the foamed or expanded lubricant for re-use and also release the pressure from within the device.

Further objects and advantages of this invention will be more clearly understood from the following description and the accompanying drawings in which:

Fig. 1 is a side view in central vertical section of a friction heater embodying our invention.

Fig. 2 is a sectional end view on line 2—2 of Fig. 1.

Fig. 3 is a similar view on line 3—3 of Fig. 1.

Fig. 4 is a face view, partly in central vertical section, illustrating one form of heat transfer device and vent used with said device.

Fig. 5 is a side view partly in central vertical section, showing our improved heat generator installed in a water heater.

In the embodiment of our invention illustrated in the drawings, the numeral 5 denotes a cylindrical casing having an end plate 6 threaded to the rear end thereof and another end plate 7 threaded to the front end. Adjacent to said end plates and spaced therefrom, there are also threaded in said casing a stationary friction plate 8 and a similar plate 9. Each of these plates has a series of openings 10 and is provided with wrench receiving recesses 11 to permit turning of the plates for assembly purposes.

A drive shaft 12 is journaled in suitable bearings 13 and 14, in the plates 6 and 7 respectively, and extends through the plates 8 and 9. This shaft carries thereon friction disks 15 and 16 which are slidably keyed on the drive shaft 12 and urged into contact with the friction plates 8 and 9, respectively, by means of springs 17 and 18 that are anchored upon the shaft by means of collars 19 and 20.

The said drive shaft also carries thereon pairs of friction bars 21 which are slidably carried upon the opposite ends of tubes 22, the ends of which telescope in bearing members 23 carried by the bars 21. A spring is carried in each of said tubes 22 urging the friction bars at the opposite ends thereof into yielding frictional contact with the inner surface of the cylindrical wall of the casing 5. It will be noted that the tubes 22 are staggered in the drive shaft 12 with a series of similar tubes 24 that carry the friction bars 25 between the opposed bars 21.

The cylindrical casing 5 is filled to a suitable level with a lubricant, preferably in the form of oil, and a packing 26 with a gland 27 is provided in the end plate 7 to prevent leakage of said oil from the casing.

In the operation of said device, the drive shaft 12 is driven by a suitable motor 28 and the disks 15—16 with the bars 21 and 25 will produce friction against the respective stationary surfaces of the bars 21 and plates 8 and 9 and thereby generate heat which will heat the oil within the casing as well as the casing itself. This heated oil will circulate between the parts within the casing and through the openings 10 in the friction plates 8 and 9, and the turbulence caused by the moving parts will produce a foam from said oil which, together with the heat generated in the casing, will create a pressure.

In order to release the pressure within the cylinder and to condense the foam from the oil and at the same time transfer the heat from said oil for heating purposes, we provide a tubular coil 29 which has an end 30 thereof connected to the upper wall portion of the casing 5, at one end therof, and preferably communicates with said casing between the plates 6 and 8.

The said coil is vertically disposed and has its upper end portion 31 projecting downwardly and terminating in an open end 32 above a suitable cup 33 at the end of a tube 34 that is connected to the opposite end of the casing 5 and extends downwardly thereinto between the plates 7 and 9 to a plane below the upper wall portion of said cylinder and below the level of the oil therein. This tube 34 is preferably detachably connected by a packing nut 35 which is threaded to a boss 36 on said casing.

During the operation of the heat generator, the foam created from the oil by the turbulence within the cylinder is forced upwardly into the coil 29. As the said foam enters the coil, it is condensed and the larger portion of the resulting condensate flows back down the coil and the portion 30 thereof into the cylinder. The foam, being lighter than the condensate, will continue to rise in the coil over the condensate flowing downwardly therein and, when it reaches the top of the coil, it will be forced into the portion 31 thereof wherein it will return to a fluid state and empty into the cup 33. The foam is prevented from rising into the tube 34 because the end of the said tube is located below the level of the oil in the cylinder and, due to the vent at the end 32 of the coil, the pressure created therein will not build up sufficiently to force the oil level below the end of the said tube.

The space between the end 32 of the coil and the cup 33 provides a vent for releasing the pressure within the cylinder and also provides an exit for the oil contained in the coil.

In the illustration of Fig. 5, our improved generator is shown as installed in a water heater wherein the numeral 37 denotes a water container having the usual inlet and outlet pipes 38—39, respectively. In such installation, the casing 5 extends through the container and is secured to the walls thereof in a water tight manner, preferably by welding it thereto. The coil 29 is then disposed within the container so that it is in direct contact with the water therein for heating the said water, in addition to the heating which is derived from the direct contact between the water and the casing 5. It will be noted that in such an installation the vent at the open end 32 is positioned upon the exterior of the water heater so that the interior of the heat generator is completely separated from the water in the container. In such an installation, the casing 5, being fully surrounded and directly contacted by the water in the container, will be kept at a satisfactorily low temperature since the heat generated therein will be immediately transferred therefrom and thus permit frictional generation of heat without accumulating excessively high temperatures.

It will be understood that the lubricant is provided within the heat generator mainly for the purpose of preventing wear on the friction plates and bars and that, while the said lubricant may reduce friction to some extent, the particular oil used is of a characteristic which will have high wear preventing qualities with low lubrication value and we have found that, by permitting the wooden friction members to become impregnated with this oil, very high resistance to wear and heat is obtained which will permit long usage of the friction members and efficient generation of heat.

In order to facilitate the flow of the oil between the friction surfaces, the friction bars 21 and 25 are preferably provided with grooves 40 extending lengthwise in the surfaces thereof and the friction disks 15 are provided with the grooves 41 for the same purpose.

Our improved heat generator may be readily disassembled by simply removing the end plate 7, then loosening the nut 35 and pulling out the tube 34. The wall member 9 may then be removed, by unthreading it through the end of the cylinder, and thereafter the shaft 12 with all of the frictional members thereon may be pulled out from the front end of the casing.

The above described heat generator has been found highly efficient for heating air, water and other liquids and particularly for heating certain chemicals where heating by combustion or electrical resistance is not safe or practical.

We claim:

1. A friction heat generator device comprising a casing having a cylindrical wall, a pair of end plates closing the opposite ends of said casing, a drive shaft journaled in said end plates, a plurality of friction bars mounted on said shaft and retained in frictional engagement with the walls of said casing, means between said bars yieldingly urging them into said frictional engagement, a friction wall member extending transversely in said casing, a friction disk slidably secured to said shaft for rotation therewith, and spring means on said shaft urging said friction disk into heat generating frictional contact with said member.

2. A heat generating device comprising a casing having a cylindrical wall, end members at the ends of said casing, friction plates extending transversely within said casing and spaced from said end members, a drive shaft journaled in said end members and extending through the friction plates, friction means carried on said shaft and yieldingly urged into frictional contact with the cylindrical wall and the surface of each of said friction plates for generating heat within said casing upon rotation of the drive shaft, and means including openings in said friction plates for permiting circulation of liquid through said casing.

3. A friction heat generator comprising a casing having a cylindrical wall, a shaft rotatable in said casing, friction plates adjacent to and spaced from the opposite ends of said casing and extending transversely to said shaft, friction members carried by said shaft in frictional engagement with the surface of said cylindrical wall and the friction plates for generating heat upon rotation of said shaft, the said frictional members comprising a plurality of bars in engagement with the cylindrical wall and discs rotatable with the shaft and in engagement with the said friction plates, and spring means anchored on said shaft for urging said discs into contact with the friction plates.

4. A friction heat generator comprising a casing having a cylindrical wall and containing liquid up to a substantially predetermined level, means rotatable within said casing for creating friction and generating heat, a tubular coil disposed vertically exteriorly of and above said casing, the lower end of said coil communicating with the interior of the casing at a level above the level of the liquid therein, the upper end of said coil terminating with a downwardly open portion, and a separate tube communicating with the opposite end of the casing at a level below the level of the said liquid; the said separate tube having an upwardly open end portion spaced from the downwardly open end portion of the coil and adapted to receive liquid dripping therefrom.

5. A friction heat generator comprising a cylindrical casing adapted to contain a liquid and having end members at the opposite ends thereof, a drive shaft rotatable in said casing, friction means carried by said drive shaft in yielding frictional engagement with the inner surfaces of the wall casing, and liquid circulating means including a tubular coil located externally of and above said casing and having one end thereof communicating with an upper portion of the interior of the casing and the opposite end communicating with the said interior at a plane below the said upper portion and the level of the liquid in the casing.

HERBERT W. LOVE.
SEBASTIAN LA MONICA.

REFERENCES CITED

The following references are of record in the file of this patent:

UNITED STATES PATENTS

| Number | Name | Date |
|---|---|---|
| 1,126,354 | Becker | Jan. 26, 1915 |
| 1,650,612 | Denniston | Nov. 29, 1927 |
| 1,758,207 | Walker | May 13, 1930 |
| 1,975,440 | Wall et al. | Oct. 2, 1934 |
| 2,090,873 | Lazarus | Aug. 24, 1937 |
| 2,095,017 | Wilkes et al. | Oct. 5, 1937 |
| 2,251,344 | Tesch | Aug. 5, 1941 |

FOREIGN PATENTS

| Number | Country | Date |
|---|---|---|
| 87,136 | Germany | June 13, 1896 |
| 34,213 | Norway | Feb. 20, 1922 |
| 377,818 | Germany | June 28, 1923 |
| 284,824 | Great Britain | Feb. 9, 1928 |